United States Patent [19]
Sirianni et al.

[11] 3,857,925
[45] Dec. 31, 1974

[54] PREPARATION OF REINFORCING AMORPHOUS SILICA

[75] Inventors: Aurelio F. Sirianni; Norman A. Funnell; Ira E. Puddington, all of Ottawa, Ontario, Canada

[73] Assignee: Canadian Patents and Development Limited, Ottawa, Ontario, Canada

[22] Filed: July 11, 1972

[21] Appl. No.: 270,636

[30] Foreign Application Priority Data
July 27, 1971   Canada ................................ 119214

[52] U.S. Cl. .............. 423/339, 423/338, 106/288 B
[51] Int. Cl.. C01b 33/14, C01b 33/16, C01b 33/18
[58] Field of Search .......... 423/338, 339; 106/288 B

[56]         References Cited
         UNITED STATES PATENTS
2,601,235   6/1952   Alexander et al. ................. 423/339
2,731,326   1/1956   Alexander et al. ................. 423/338
2,763,533   9/1956   Ashley et al. ....................... 423/330
2,940,830   6/1960   Thornhill ........................... 423/339
3,235,331   2/1966   Nauroth et al. ..................... 423/339

Primary Examiner—Edward Stern
Attorney, Agent, or Firm—Cushman, Darby & Cushman

[57]            ABSTRACT

An amorphous, pulverulent, dry silica is prepared which is particularly useful for reinforcing rubber. It is produced by:
 a. preparing seed particles by adding a mineral acid to a dilute alkali metal silicate solution containing 1 to 3% by weight of $SiO_2$ to form a sol having a pH of about 4.5 – 6.5 and allowing the sol to set into a firm aquagel,
 b. diluting and dispersing the aquagel in water to form an aqueous dispersion of aquagel seed particles,
 c. mixing with said dispersion an alkali metal silicate solution,
 d. adding acid to said seed dispersion-alkali metal silicate mixture at a temperature of about 75° – 100° C to quickly lower the pH to about 1 to 4 and precipitate silica,
 e. separating the wet precipitated silica from the associated liquid and drying the freshly precipitated silica.

15 Claims, No Drawings

PREPARATION OF REINFORCING AMORPHOUS SILICA

BACKGROUND OF THE INVENTION

1. Field of the Invention

This invention relates to finely divided precipitated silica particles and to processes for preparing the same. More particularly, the invention relates to the production of amorphous, pulverulent silica which is produced by reacting aqueous alkali metal silicate solutions with an acidification agent. The novel silica products of this invention are particularly useful as rubber reinforcing agents.

2. Description of Prior Art

Prior to the present invention, it has been known that silica can be prepared by reacting alkali metal silicate solutions with acids. When a dilute solution of sodium silicate is treated with acid, a sol of silicic acid is formed. On standing, this sol sets to a firm, transparent gel. Although the mechanism of this change is not entirely understood, it appears to be due to the formation of polymers from the liberated silicic acid and the cross-linking of these aggregates to form a three-dimensional structure.

Alexander et al U.S. Pat. No. 2,731,326 describes a process for producing pulverulent, dry silica xerogels in which an aquasol is made which serves as a heel or seed for subsequent additions of solutions of sodium silicate and sulfuric acid. Such additions are made at a rate sufficient to maintain the pH of the reaction mixture above 9 and preferably between 10 and 11. The clear aquasol is heated to 95° C in about 15 minutes. The temperature is maintained at 95° C throughout the addition of acid and silicate and finally the pH of the solution is adjusted from about 10 to 5 at 95° C. The slurry thus obtained is then maintained at 85° to 95° C without agitation for 4 hours in order to further coagulate the precipitate to aid in filtration. However, during the final step of dehydrating the wet cake to a xerogel, it has been found that a significant collapse or shrinkage of the filter cake takes place and the product is not useful for reinforcing rubber.

In Ashley et al U.S. Pat. No. 2,763,533, there is described a process for the formulation of silica gel which comprises the substantially simultaneous admixing of a diluted sodium silicate solution having a high pH and a silicic acid solution having a low pH in such proportions as to maintain a pH of 6.0 to 8.5 during the admixture and in such a manner that the solutions are admixed in the presence of a gel for practically the entire period of admixing. The silicic acid colloidal solution may be prepared from diluted sodium silicate solution (3 to 12% $SiO_2$) by adding a mineral acid so as to keep the pH of the silicic acid colloidal solution always within the range of 1 to 4.5 and preferably in the range of 1:3. However, silica made in accordance with the above procedure is quite unsatisfactory for use in the reinforcement of rubber.

Nauroth et al U.S. Pat. No. 3,235,331 discloses a method of providing a precipitated silica which is stated to be useful as a reinforcing agent for rubber. This patent discloses a process in which a pool of an aqueous alkali metal silicate solution is established and afterwards an aqueous alkali metal silicate solution and acid are simultaneously added to the pool. It is pointed out that this simultaneous addition is continued until the viscosity of the pool rises through a maximum and then falls to a substantially lower value. The amount of the acidification agent and alkali metal silicate are so proportioned as to maintain a pH of the resulting slurry substantially constant throughout the major portion of the reaction in the range of about 10 to 12. The process is conducted at a temperature of about 80° to 90° C and the product, after drying, gives a silica with a surface area of 260 square metres per gram. However, this process has been found to have the disadvantage that the presence of silica nuclei in the reactor seriously impairs the rubber-reinforcing properties of the silica product.

Marotta U.S. Pat. No. 3,428,425 is also concerned with the production of finely divided precipitated silica particles and adds sodium silicate solution to an aqueous acidic heel at pH 3.5 to 5.9. According to that inventor, it is essential in order to obtain his desired xerogel, that the aqueous heel and resulting slurry be maintained at a temperature below 50° C, preferably from about 20° to 45° C, during the time that a substantial portion or part of the total silicate solution is added to the slurry. The slurry temperature is then raised to from about 70° C to about 95° C and the remaining quantity of the silicate solution and sufficient acid are fed to the slurry at a rate sufficient to maintain the pH at less than 6.0, preferably at from about 3.5 to 5.9. It is also necessary to carry out the overall silicate addition to the slurry over an extended period of time, preferably from about 1 hour to about 3 hours or more to achieve the desired xerogel product. It is quite clear from this patent that it is not concerned with reinforcing agents for rubbers and the products obtained from this prior process are, in fact, not suitable for that purpose.

It is the object of the present invention to provide a process for preparing amorphous silica in a simple and inexpensive manner which will be highly useful for the reinforcing of rubbers.

SUMMARY OF THE INVENTION

According to the present invention, seed particles are first formed by adding an aqueous solution of a mineral acid to a sodium silicate solution so as to produce a sol containing 1 to 3% $SiO_2$ by weight and allowing this sol to set into a firm gel. Sufficient acid is added to lower the pH of the aquagel formed to about 4.5 to 6.5, preferably 5.5.

The aquagel thus formed is then dispersed in water to provide a dilute, uniform aqueous dispersion of small seed particles. To this dilute dispersion of seed particles is added fresh sodium silicate. The mixture thus formed, at a temperature in the range of 75° to 100° C, preferably 85° – 95° C, has further acid added thereto to quickly drop the pH to a range of 1 to 4 to cause precipitation of silica. The desired mixture temperature can be attained either by heating the mixture itself or by preheating reagents or precursors of the mixture.

The wet precipitated silica which is formed is immediately separated from the liquid, e.g. by filtration, and dried to form amorphous, pulverulent silica.

DESCRIPTION OF PREFERRED EMBODIMENTS

The silicate feeds used in the novel process of the present invention may be any of the various known alkali metal silicates, and is preferably sodium silicate. Commercial sodium silicate is marketed in various forms, such as pure crystals; crude lumps or powders;

C.P.; or in solutions of various concentrations ranging from viscous semi-liquids to thin watery fluids. Although any of these forms are useful starting materials for the application of the principals of the present invention, it will be readily appreciated that a solution of sodium silicate is the most adaptable form due to the ease of handling and facility of reaction with other solutions.

In addition to appearing on the market in various concentrations, these sodium silicate solutions also appear in various molar ratios of $SiO_2$ to $Na_2O$. For example, such solutions are available in ratios of 3.9 $SiO_2$ to 1.0 $Na_2O$, 3.36 $SiO_2$ to 1.0 $Na_2O$, etc. with various other ratios being available. The particular form, concentration and specific proportion of ingredients contained therein do not form an essential or critical part of the invention and, therefore, in the following discussion and examples wherein "N-brand" sodium silicate solution having a 28.7% $SiO_2$ and 8.90% $Na_2O$ content, 41.0° Baume and a highly basic pH of approximately 12 to 14, is used, such is to be considered illustrative but not limitative of the invention. For the purposes of the invention, the term "commercial sodium silicate" is intended to refer to and include any and all of the forms above mentioned or equivalent thereto.

The diluted sodium silicate of the present invention may be prepared from substantially any of the above forms of sodium silicate but it is preferred that "N-brand" sodium silicate solution be used. Such a diluted solution may be very easily prepared by the addition of sufficient water to the commercial sodium silicate solution to bring the $SiO_2$ concentration down to the range of 1 to 3% $SiO_2$. This low concentration is necessary for producing satisfactory seed particles.

The silicic acid colloidal solution or sol may be prepared from the diluted sodium silicate solution by adding thereto a sufficient amount of an acid, preferably a mineral acid such as sulfuric acid, hydrochloric acid, nitric acid, etc., so as to adjust the pH of the sol to within the range of about pH 4.5 – 6.5. It is highly desirable to adjust the pH of the sol to a substantially neutral range and it is particularly desirable to obtain an aquagel having a pH close to its isoelectric point, e.g. about 5 – 6. If the pH is too low the gelation occurs too slowly and very few seed particles are formed. On the other hand if the pH is too high, the seed particles also are very slow to form. The formation of the seed particles is conveniently carried out at room temperature.

The mineral acid employed in the preparation of the silicic acid solution may be of any desired strength, but, in the interest of facility of use and the avoidance of local affects a relatively low concentration such as a 1:1 ratio is preferred.

The silicic acid colloidal solution which is obtained is allowed to age for several hours and during this time sets to a firm gel. This firm gel then becomes the seed for subsequent processing.

A portion of the gel seed particles are mechanically homogenized with water and diluted to a convenient dilution. A wide range of dilutions are possible and it is evident that the dilution must be sufficient to have the seed particles well dispersed in order to obtain optimum results. Of course, if the dilution is too great, the process becomes rather uneconomical because of the large volumes of water to be handled. A convenient dilution has been found to be to about 10 – 20% of the total volume at final precipitation, although it is to be understood that the invention is in no way restricted to this particular dilution.

To this dilute dispersion of silica aquagel seeds is added fresh sodium silicate solution with stirring. Preferably an excess, e.g. 10 – 50% excess of sodium silicate (over the silicate in the seed) is added. According to a particularly desired feature, an amount of seed dispersion equivalent to 100 – 900 grams of aquagel seed is mixed with 100 grams of sodium silicate solution (28.7% $SiO_2$). The mixture thus formed is then heated to a temperature in the range of about 75° to 95° C or, alternatively, the dilute seed dispersion and sodium silicate can be heated separately and then mixed together. When the components have been thoroughly mixed at the above temperature, acid is added in sufficient quantity to quickly lower the pH to a range of 1 – 4, preferably pH 2.0 – 3.5, to precipitate silica. During this procedure it is believed that a suspension of silica sol is quickly absorbed by the aquagel seed particles. On a commercial scale, a continuous mixing and precipitation with reagents preheated to temperature, is possible and the time involved is reduced.

The product obtained is immediately filtered with the precipitate being removed as a filter cake and the unused silica sol remaining with the liquid portion. This unused excess silica sol can be re-used in the preparation of fresh silica aquagel seed particles.

The filter cake is dried to form the final product and this can be conveniently accomplished by mixing the filter cake with an organic solvent, e.g. alcohol, to form a slurry which is dried under heating, e.g. at 95° C in an air oven. Agglomerates of the silica product can be easily broken to give a product having a fluffier state by mixing in a mechanical blender for a few seconds.

It is also advantageous to add a small amount of surface active agent to the filter cake before drying as this reduces the tendency of the particles to agglomerate.

The amorphous, pulverulent silica of this invention can be produced very inexpensively and the serious prior art problem of collapse and shrinkage of the gel in the final drying is substantially avoided. The product has been found to be exceptionally effective as reinforcing agent for rubber when compared with prior silicas for this purpose and is also useful as a thickener for greases and as an opaquing agent.

In order to evaluate the silica products of the invention as reinforcing agents for rubber, a rubber masterbatch composition was prepared having the following components:

MASTERBATCH "A"

| | | |
|---|---|---|
| Krylene 1500 (Trade mark for SBR available from Polymer Corp.) | 100 | parts by weight |
| PBNA (phenyl-β-naphthlamine) | 2 | do. |
| litharge | 2 | do. |
| stearic acid | 2 | do. |
| sulfur | 2 | do. |
| cumate (Cu dimethyl dithiocarbamate) | 0.3 | do. |
| Altax (Trade mark for benzothiazyl disulfide) | 1 | do. |

Enough of the above masterbatch for 20 to 30 individual tests was mixed on a 12 inch open mill. The treated rubber was rolled and covered with aluminium foil while being stored at room temperature at about 25° C.

To portions of this masterbatch were added the following ingredients:

| Ingredients "B" | | |
|---|---|---|
| Silane A174 (Trade mark of Union Carbide for γ-ethacryl-oxypropyl trimethoxy silane) | 2 | parts by weight |
| silica | 40 | do. |
| Circosol 42 – 40 (Trade mark of Sun Oil Co. for rubber processing oil) | 5 | do. |
| zinc oxide | 5 | do. |

Portions of about 109 grams of the masterbatch "A" were sheeted and then thoroughly blended with the ingredients "B" in the order given above. A total of about 10 minutes net milling time was used. The sample was then passed through the mill 6 times and an 80 gram portion was cured at 138° C under 1500 psi pressure. Times of cure were estimated by means of a Shawbury Curometer. The specimen was chilled under water, stored at room temperature for 1 hour or longer before testing for tensile strength by ASTM Method D412-68.

A further understanding of the processes of this invention will be obtained from the following specific examples which are intended to illustrate the invention, but not to limit the scope thereof, parts and percentages being by weight unless otherwise specified.

EXAMPLE 1

A seed composition was first prepared by making up a diluted solution of "N" grade sodium silicate supplied by National Silicate Limited, this solution containing 2.5% by weight silica. While stirring, the solution was neutralized with 1:1 sulfuric acid from about pH 12 to pH 5.5 at room temperature. Minor pH adjustments were carried out with 1 normal sodium hydroxide solution. Stirring was stopped and the silica sol set to an aquagel on standing for about 1 to 2 hours. This aquagel then served as the seed for the subsequent growth of silica particles in the presence of specially prepared silica sol. Particle growth on the silica aquagel seed was carried out as follows:

After standing at least 24 hours at room temperature, about 100 g quantity of the silica aquagel seed containing 2.5% silica by weight was mixed with 300 ml water in a Waring blender for 15 seconds. The suspension was transferred to a 4 liter beaker then diluted to 3,000 ml with water. Hot water at the desired temperature can be used. About 100 g "N" grade sodium silicate solution (28.7% $SiO_2$) was added, the system was heated while stirring up to 90° C, then neutralized with 1:1 sulfuric acid to about pH 3. Minor pH adjustments were made with 1 normal sodium hydroxide solution. The aqueous silica slurry was filtered under suction immediately at 90° C in order to separate substantially unused silica sol.

In order to examine the effect of temperature on particle growth, other silica products were prepared in similar fashion at 75°, 80°, 85°, 95° and 100° C. The filtered cake weighing about 150 g was mixed with 200 ml of isopropyl alcohol in a Waring blender for about 60 seconds and then the slurry was dried in an air oven at 90° C for 24 hours. These experiments were each repeated 4 times under identical experimental conditions and the products obtained were blended together. The air dried product transformed into a fluffier material by mixing in a Waring blender for about 1 minute. The aquagel used as seed shrank to a hard mass with an apparent bulk density of about 0.57 g/ml when treated under identical conditions in isopropyl alcohol. Surface area measurements were carried out using a Strohlein area meter.

The silica products obtained were then evaluated as reinforcing agents for rubber using the rubber masterbatch "A" described above. The rubber masterbatch was sheeted and the silane was dispersed into it by milling. This was followed with the addition of silica, the oil and finally the zinc oxide. The system was milled for approximately 10 minutes and the time of cure was estimated using a Shawbury Curometer (H. W. Wallis & Co., Ltd.). The sample was then passed through the mill six times and an 80 g portion was cured. The vulcanizate was chilled under water and stored at room temperature for at least 1 hour before testing for tensile strength. The physical properties of the vulcanizates, and the surface areas, apparent bulk densities and yield of the silica products obtained as a function of the temperature employed to form the silica, are shown in Table 1.

Table 1

Effect of Temperature on 2.5% gel at pH 3.0

| Temp. °C. | Surface Area $m^2/g$ | Apparent Bulk Density g/ml | % Yield | Cure Time min. | 300% modulus psi | $T_B$ | $E_B$ | H |
|---|---|---|---|---|---|---|---|---|
| 75 | — | — | 33 | 30 | 520 | 2570 | 760 | 68 |
| 80 | 408 | 0.094 | 37 | 30 | 420 | 2725 | 770 | 65 |
| 85 | 393 | 0.089 | 40 | 30 | 435 | 3255 | 760 | 66 |
| 90 | 356 | 0.077 | 42 | 30 | 490 | 3370 | 710 | 65 |
| 95 | 349 | 0.061 | 45 | 30 | 470 | 3340 | 710 | 65 |
| 100 | 305 | 0.047 | 61 | 30 | 480 | 3090 | 625 | 57 |
| 75 | | | | 35 | 570 | 2780 | 570 | 69 |
| 80 | | | | 35 | 460 | 2780 | 750 | 66 |
| 85 | | | | 35 | 440 | 3215 | 750 | 69 |
| 90 | | | | 35 | 490 | 3360 | 710 | 67 |
| 95 | | | | 35 | 480 | 3230 | 695 | 66 |
| 100 | | | | 35 | 490 | 2870 | 610 | 57 |

The above Table 1 shows that at 2.5% silica concentration and acidification to pH 3, the best tensile strengths are obtained from the silica aquagel seed-silica sol when the silica product is prepared between 85° and 95° C.

EXAMPLE 2

As a further illustration of this invention, a number of samples of amorphous silica were prepared using a 2.5% silica aquagel as seed. The neutralization of the suspension in the presence of sodium silicate was carried out with 1:1 sulfuric acid to pH 1, 2, 3, 4, and about 5.5 at 90° C. The physical properties of the vulcanizate and that of the silica product are shown in Table II.

drochloric acid solution instead of the 1:1 sulfuric acid solution. A 2.5% silica content silica aquagel was used as seed and the aquagel-sodium silicate suspension was neutralized to pH 3 at 90° C. The physical properties of the vulcanizate and that of the silica product are shown in Table IV below.

Table II

Effect of pH using a 2.5% silica aquagel as seed and a neutralization temperature of 90°C.

| pH | Surface area m²/g | Apparent bulk density g/ml | % Yield | Cure time min. | 300% modulus psi | $T_B$ psi | $E_B$ | H |
|---|---|---|---|---|---|---|---|---|
| 1 | 242 | 0.147 | 43 | 30 | material sticks to mill | | | |
| 2 | 329 | 0.119 | 44 | 30 | 200 | 1975 | 880 | 54 |
| 3 | 356 | 0.077 | 42 | 30 | 490 | 3370 | 710 | 65 |
| 4 | 325 | 0.088 | 57 | 30 | 570 | 1950 | 560 | 60 |
| 5.5 | 330 | 0.308 | 98 | 30 | 455 | 610 | 720 | 61 |
| 1 | | | | 35 | material sticks to mill | | | |
| 2 | | | | 35 | 220 | 2040 | 865 | 54 |
| 3 | | | | 35 | 490 | 3360 | 710 | 67 |
| 4 | | | | 35 | 600 | 1845 | 545 | 60 |
| 5.5 | | | | 35 | 500 | 670 | 650 | 62 |

Table IV

| % conc. Silica | Surface area m²/g | Apparent bulk density g/ml | % Yield | Cure time min. | 300% modulus psi | $T_B$ psi | $E_B$ | H |
|---|---|---|---|---|---|---|---|---|
| 2.5 | 384 | 0.136 | 44 | 30 | 635 | 2725 | 670 | 65 |
| | | | | 35 | 690 | 2535 | 675 | 66 |

It is indicated in Table II that the highest tensile strength for the vulcanizate is obtained with the silica product prepared at about pH 3.

EXAMPLE 3

As another illustration of this invention, the silica content of the aquagel used as seed was varied. The neutralization of aquagel-sodium silicate system with 1:1 sulfuric acid was held constant at pH 3 and 90° C in all cases. The physical properties of the vulcanizate and that of the silica product are shown in Table III.

Table III

Physical properties of vulcanizate and of the silica product prepared at pH 3 and 90°C by varying the concentration of silica in the aquagel seed.

| % conc. Silica | Surface area m²/g | Apparent bulk density g/ml | % Yield | Cure time min. | 300% modulus psi | $T_B$ psi | $E_B$ | H |
|---|---|---|---|---|---|---|---|---|
| 1 | 292 | 0.062 | 18 | 30 | 760 | 2575 | 560 | 67 |
| 2 | 336 | 0.058 | 36 | 30 | 450 | 3520 | 740 | 67 |
| 2.5 | 356 | 0.077 | 42 | 30 | 490 | 3370 | 710 | 65 |
| 3 | 352 | 0.110 | 47 | 30 | 630 | 2820 | 650 | 70 |
| 1 | | | | 35 | 800 | 2880 | 570 | 68 |
| 2 | | | | 35 | 450 | 3400 | 730 | 64 |
| 2.5 | | | | 35 | 490 | 3360 | 710 | 67 |
| 3 | | | | 35 | 645 | 2880 | 640 | 70 |

It is indicated in Table III that vulcanizates having the highest tensile strengths are obtained from aquagels as seed containing 2 to 2.5% silica by weight.

EXAMPLE 4

The above procedures were repeated using a 1:1 hy-

EXAMPLE 5

Further tests were conducted to illustrate that the water-wet product is also amenable to treatment by surfactants such as amine acetates or ammonium oleate extended with an SAE 10W hydrocarbon oil or Circosol 42 – 40. The water-wet product was treated with Armac 18D (trademark of Armour and Company for octadecyl amine acetate) and SAE 10W hydrocarbon oil in the following fashion.

About 150 g of filter cake were obtained after a 2.5% silica content aquagel, prepared at pH 5.5 using 1:1 hydrochloric acid was contacted with 100 g. of "N" grade sodium silicate in 3 litres of water, and the system neutralized at 90° C to pH 3 using 1:1 hydrochloric acid. The suspension was filtered immediately and the filter cake was mixed with 2 g Armac 18D plus 15 g SAE 10W oil in a Waring blender for 10 minutes. The water was removed from the microagglomerates by air drying at 90° C for 24 hours. The material was dispersed in a Waring blender for 1 minute, then the organic coating was volatilized at 400°–420° C for 24 hours. Four similar runs were made and the products blended together. Similar runs were made using Armac 12**, Armac 8D*, or ammonium oleate. The yields of product based on the total weight of silica content in the system was about 40% in all cases. The physical properties of the vulcanizates and of the products are shown in Table V below.

This silica was used to reinforce an SBR masterbatch in the same manner as described in Example 1 of the present application with 40 parts of silica being used per 100 parts of SBR rubber. The curing time was 35 minutes at 275° F.

On testing the physical properties of the resulting vulcanizate, it was found to have a tensile strength of 570 p.s.i. This is significantly less than the results obtained with the silica of the present invention.

EXAMPLE 8

A comparative test was also made in relation to U.S. Pat. No. 3,235,331 (Nauroth et al).

Table V

| Treatment | Surface area $m^2/g$ | Apparent bulk density g/ml | Cure time min. | 300% modulus psi | $T_B$ psi | $E_B$ | H |
|---|---|---|---|---|---|---|---|
| Armac 18D (2 g) + SAE 10W (15 g) | 273 | 0.083 | 25 | 420 | 3670 | 940 | 58 |
|  |  |  | 30 | 530 | 3390 | 790 | 62 |
| Armac 8D* (2 g) + SAE 10W (15 g) | — | 0.059 | 30 | 560 | 3390 | 760 | 62 |
|  |  |  | 35 | 640 | 3330 | 710 | 66 |
| Armac 12** (2 g) + SAE 10W (15 g) | — | 0.054 | 30 | 560 | 3050 | 680 | 62 |
| Armac 12 (2 g) + Circosol 42-40 (15 g) | — | 0.049 | 30 | 670 | 2975 | 620 | 62 |
|  |  |  | 30 | 670 | 2975 | 620 | 62 |
| NH4 Oleate (2 g) + Circosol 42-40 (10 g) | — | 0.109 | 25 | 325 | 2725 | 970 | 58 |
|  |  |  | 30 | 425 | 3210 | 860 | 60 |
| Armac 18D (1 g) + Circosol 42-40 (5 g) | — | 0.121*** | 30 | 540 | 3160 | 780 | 64 |
|  |  |  | 35 | 700 | 3190 | 690 | 68 |

*(trademark for octylamine acetate)
**(trademark for dodecylamine acetate)
***1:1 sulfuric acid was used instead of 1:1 hydrochloric acid.

EXAMPLE 6

In order to illustrate the significance of the results in the above Examples 1 – 5, the same vulcanizates as described in Example 1 were filled with commercially available silica products in place of the silica of this invention. The results obtained are shown in Table VI below.

Table VI

| Silica | Cure time min. | 300% modulus psi | $T_B$ psi | $E_B$ | H |
|---|---|---|---|---|---|
| Cab-o-sil (trade mark for silica) | 30 | 610 | 3260 | 600 | 64 |
|  | 35 | 660 | 2980 | 570 | 64 |
| QUSO (trade mark of Philadelphia Quartz Co. for silica) | 30 | 665 | 2364 | 730 | 50 |
|  | 35 | 890 | 2470 | 630 | 53 |

EXAMPLE 7

As further example of the superiority of the silica product of this invention over the prior art silicas, a comparative test was made using finely divided silica prepared according to Example 1 of U.S. Pat. No. 3,428,425.

About 70 ml sodium silicate "N" grade were diluted with about 1.5 litres of water at 80° C. While stirring, the temperature was raised to 86° C. Over a period of 100 minutes, 100 ml of sodium silicate and 9% sulfuric acid solution were added to maintain the pH between 10 and 11.5. The system at 86° C was then acidified to pH 7 and eventually to pH 2.5 with 9% sulfuric acid. The suspension was filtered immediately under suction using a 33 cm. diameter filtering apparatus. The filter cake was washed with 3 litres of water in order to remove water-soluble salts. As a closer comparison to the method of this invention an identical experiment was carried out but the filter cake was not washed with water. The filter cake was treated with 500 ml isopropyl alcohol and dried.

Two further tests were conducted according to the present invention. A silica aquagel seed was prepared, which acts as a heel or starting material for particle growth to take place. The seed was dispersed in water, sodium silicate solution was added and the suspension was acidified to about pH 3 at about 90° C. This suspension was filtered immediately. The entire operation required about 10 minutes and no aging was required.

The reinforcing properties of the above silicas are shown in Table VII below.

Table VII

| Method | Treatment | Time of cure | 300% modulus | $T_B$ | $E_B$ | H |
| --- | --- | --- | --- | --- | --- | --- |
| Nauroth | unwashed | 25 min. | 620 | 1415 | 550 | 62 |
| Nauroth | washed | 30 min. | 400 | 3250 | 820 | 64 |
| Ours | unwashed | 25 min. | 465 | 3750 | 750 | 70 |
| Ours | unwashed | 25 min. | 520 | 3650 | 740 | 69 |

From this it is noteworthy that according to the Nauroth et al method, the presence of silica nuclei or seeds must be avoided and the preparation is tedious and time consuming. On the other hand, the method of this invention is quick and straightforward and good reinforcement is obtained without washing.

EXAMPLE 9

This example shows that the recovery of reinforcing silica is increased by increasing the silica aqaugel seed to sodium silicate solution ratio in the suspension.

a. Following generally the procedure of Example 1, 400 grams of silica aquagel seed containing 2.5% silica by weight was mixed and diluted with water to about 1,200 ml. This was then mixed with 100 grams "N" grade sodium silicate solution and diluted to a total of about 3 liters. The system was heated to about 90° C and then neutralized with 1:1 sulfuric acid to about pH 3. The yield of silica product was about 80%, compared with about 40% in Example 1.

b. Following a similar procedure to the above, 900 grams of 2.5% $SiO_2$ content aquagel seed and 100 grams of the sodium silicate solution were used and the yield was about 85%. The reinforcing capacity of this material was as follows:

| 300% modulus | $T_B$ | $E_B$ | H |
| --- | --- | --- | --- |
| 360 | 3880 | 900 | 72 |

The above shows that by increasing the ratio of silica aquagel seed to sodium silicate solution up to an equivalent of about 400 grams silica aquagel seed to 100 grams sodium silicate solution (28.7% $SiO_2$), very significant increases in yields are achieved while little further improvements are noted at higher ratios.

EXAMPLE 10

This example also shows that the recovery of reinforcing silica is increased by increasing the silica aquagel seed to sodium silicate solution ratio in the suspension.

Following generally the procedure of Example 1, 1800 g. of silica aquagel seed containing 2.5% silica by weight was mixed with 9,000 ml. water. Then 300 g. "N" grade sodium silicate was added. The system was steam heated to 92° C, and then neutralized with 1:1 sulfuric acid to about pH 3. The slurry was filtered under vacuum, and the filter cake rinsed with 6 litres of water to remove excess salt. The filter cake was mixed with 500 ml. isopropyl alcohol and dried at 160° F.

The yield of silica product was about 90%, compared with about 40% in Example 1. The reinforcing capacity of this material was as follows:

| 300% Modulus | $T_B$ | $E_B$ | H |
| --- | --- | --- | --- |
| 520 | 3980 | 750 | 70 |

EXAMPLE 11

This example shows that the reinforcing silica is obtained even with aged silica aquagel seed.

Following generally the procedure of Example 1, 1,800 g. of silica aquagel seed containing 2.5% silica by weight, aged at room temperature for 3 days in a covered beater was mixed with 9,000 ml. water. Then 300 g. "N" grade sodium silicate was added. The system was treated as in Example 10. The yield of silica product was about 96% compared with about 40% in Example 1.

The reinforcing capacity of this material was as follows:

| 300% Modulus | $T_B$ | $E_B$ | H |
| --- | --- | --- | --- |
| 560 | 4075 | 735 | 69 |

EXAMPLE 12

Following generally the procedure of Example 10, the silica aquagel seed was aged for 31 days. The yield of silica product was about 82%.

The reinforcing capacity of this material was as follows:

| 300% Modulus | $T_B$ | $E_B$ | H |
| --- | --- | --- | --- |
| 580 | 3725 | 710 | 72 |

This indicates that aging had little affect in the yield or reinforcing capacity.

We claim:

1. A process for preparing an amorphous, pulverulent, dry silica, which comprises
    a. preparing seed particles by adding a mineral acid to a dilute alkali metal silicate solution containing 1 to 3% by weight of $SiO_2$ to form a sol having a pH of about 4.5 – 6.5 and allowing the sol to set into a firm aquagel,
    b. diluting and dispersing the aquagel in water to form an aqueous dispersion of aquagel seed particles,
    c. mixing with said seed dispersion an alkali metal silicate solution,
    d. adding acid to said seed dispersion-alkali metal silicate mixture at a temperature of about 75° – 100° C to quickly lower the pH to about 1 to 4 and precipitate silica,
    f. separating the wet precipitated silica from the associated liquid and drying the freshly precipitated silica to form an amorphous, pulverulent, dry silica.

2. A process according to claim 1 wherein the alkali metal silicate added in step (c) is in an amount in excess of the amount of alkali metal silicate in the seed.

3. A process according to claim 2 wherein the alkali metal silicate is sodium silicate.

4. A process according to claim 3 wherein the sol formed during production of seed particles has a pH of about 5 – 6.

5. A process according to claim 4 wherein the sol is allowed to set for at least 1 hour.

6. A process according to claim 3 wherein the seed dispersion-alkali metal silicate mixture is heated to a temperature of about 75° – 100° C before addition of the acid.

7. A process according to claim 3 wherein preheated reagents or precursors of the seed dispersion-alkali metal silicate mixture provide the temperature of about 75° – 100° C.

8. A process according to claim 3 wherein the seed dispersion-alkali metal silicate mixture has a temperature of 85° – 95° C before addition of the acid.

9. A process according to claim 3 wherein the acid is sulfuric acid.

10. A process according to claim 3 wherein the wet precipitated silica is removed by filtration.

11. A process according to claim 10 wherein the wet precipitated silica is dried in air at about 95° C.

12. A process according to claim 3 wherein the wet precipitated silica is slurried with an organic solvent before drying.

13. A process according to claim 3 wherein a surface active agent is added to the wet precipitated silica before drying to reduce the tendency of the precipitated silica particles to agglomerate.

14. A process according to claim 3 wherein the seed particles are formed at room temperature.

15. A process according to claim 3 wherein an amount of seed dispersion equivalent to about 100 – 900 grams of said aquagel seed is mixed with the equivalent of about 100 grams of sodium silicate solution (28.7% $SiO_2$) in step (c).

* * * * *